Sept. 23, 1958     C. L. HEISKELL, JR     2,853,448
APPARATUS FOR EFFECTING THE SEPARATION OF THE
COMPONENTS FROM A COMPLEX FLUID SYSTEM Filed April 28, 1955     2 Sheets-Sheet 1

INVENTOR.
CHARLES L. HEISKELL, JR.

BY
Attorneys

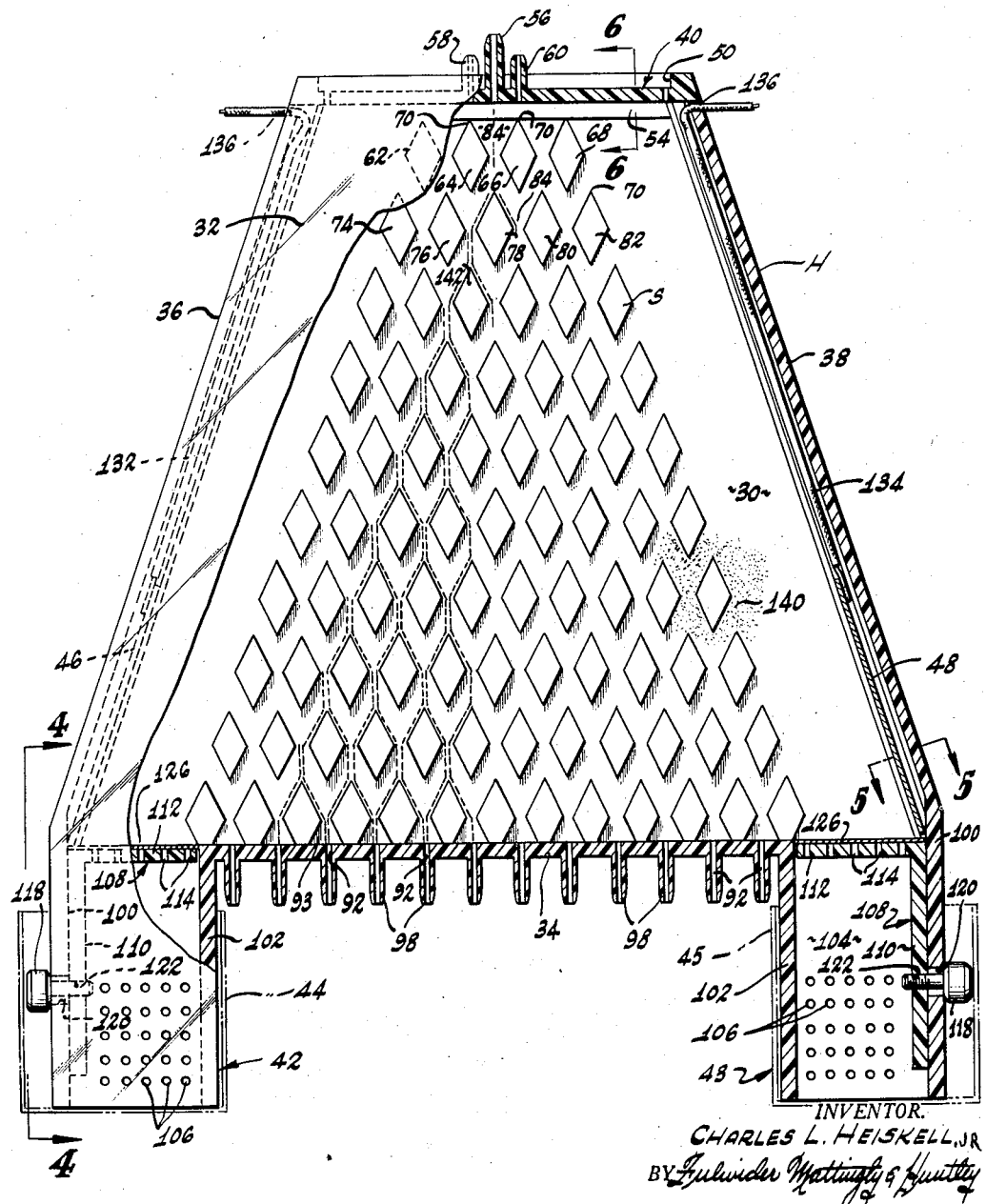

United States Patent Office 2,853,448
Patented Sept. 23, 1958

2,853,448

APPARATUS FOR EFFECTING THE SEPARATION OF THE COMPONENTS FROM A COMPLEX FLUID SYSTEM

Charles L. Heiskell, Jr., Long Beach, Calif.

Application April 28, 1955, Serial No. 504,560

3 Claims. (Cl. 204—299)

The present invention relates to a novel process and apparatus for effecting the separation of the components from a complex fluid system utilizing electrophoresis.

In the present state of the art, electrophoresis provides a valuable technique for the analytical study of complex fluid systems, and, in a few instances, the preparative separation and purification in small amounts of the components of such systems. All heretofore-proposed electrophoretic techniques, however, have serious shortcomings as analytical tools, and, most particularly, as preparative methods.

Moving boundary electrophoresis is probably the most accurate of the heretofore-proposed electrophoretic techniques, however both the apparatus and techniques of operation are unfortunately complicated, limiting its utilization to only the more elaborate laboratories and skilled workers. The optical method of recording becomes inaccurate when concentrations of the components are as low as frequently occurs with highly active substances in complex biogenic systems. Because of the short migrating distance in the conventional apparatus, substances with closely similar electrophoretic mobilities are inadequately separated, necessitating tedious manipulation of the fluid system for further adequate separation. The different components of the separated system cannot be adequately recovered in discrete form for testing and identification. As a preparative process, moving boundary electrophoresis is totally inadequate, because, at best, only the end zone components may be recovered. In addition, maximal amounts recoverable are exceedingly small, and, finally, it is inherently a batch preparative process.

The heretofore-proposed electrophoresis-convection process is not frequently used as an analytical technique inasmuch as only one component of a system can be separated from the others, and moreover the degree of purity of the separated component is low. This process is used most frequently as a preparative technique because of the easy recovery of the separated component which can be purified by subsequent runs. It is limited in application, however, because of the complexity of the apparatus and tedious technique of operation, which requires a careful control of dialysis, heating, temperature gradients, buffer concentration, and elimination of electrolysis products. Although, in theory, it can be conducted as a semi-continuous process, it, too, in practice is a batch process.

Paper electrophoresis has the advantage of simplicity both as an analytical and a small scale preparative process. For proper operation, however, the paper process requires use of a fairly complex, low-ripple, high potential power unit in order to decrease heating, distillation, electrolysis, and yet obtain adequate separation. To use this process for the determination of electrophoretic distribution curves, it is necessary to either elute the separated components from the paper and analyze them by conventional techniques, or to stain the paper strip with a dye in order to record zone concentration with a densitometer. The complexity of the densitometer discounts the simplicity of the paper electrophoresis. Further, the densitometer technique of measurement does not follow Beer's law and is inaccurate when weak or opaque dyes are used for staining purposes. As a preparative technique, columns of various types of migration media have been substituted for the paper strip, and the separated components recovered by elution. Even under ideal conditions the recovery is small, the process is laborious, and the process can be conducted only by the batch method.

Development of the technique of electrophoresis of a material moving at right angles to the electrical field was a significant theoretical step toward a continuous preparative electrophoretic process. However, as practiced in its present state, it is still semi-continuous due to the problems of heating, distillation, and deposition of material in the migration medium. The volume of material separated is also limited, inasmuch as it is dependent on diffusion, capillary attraction, and gravity for migration through the electrical field. Even if the material were moved more rapidly through the electrical field, it would be at the sacrifice of discrete separation of the components, which is dependent upon what are frequently very small differences in electrophoretic mobility. Because of heating, distillation, and deposition of the components in the migration medium, a complex power unit capable of delivering a well-filtered, full wave rectified alternating current is required as with the other techniques. The electromotive force, as now applied, is unequal in distribution, increasing exponentially as the components approach the end of the migratory path. Higher potentials are required than in other processes because of the increased migration area required. Substances having closely similar electrophoretic mobilities are not adequately separated because of the limited electromotive force that may be applied. Many labile substances cannot be subjected to such a rigorous procedure as now practiced. These shortcomings have thus far limited the process to use in only a few of its potential applications.

It is the major object of the present invention to provide a process and apparatus which will overcome the above-described disadvantages of the present electrophoretic techniques. The apparatus of the present invention is simple in construction and may be operated with a simple, comparatively low potential power supply having any degree of ripple. The process of the present invention is free of distillation, heating, or contamination of the components by electrolysis products. The separatory procedure is rapid and the separated components are readily recoverable without requiring involved manipulation, elutions, or withdrawals of layered solutions. The separated components are also relatively concentrated, purified, and discretely segregated from other components of the system in a form suitable for immediate testing or dialysis. The process and apparatus of the present invention will magnify or potentiate the small existing differences in electrophoretic mobility without increasing the potential.

Another object of the present invention is to provide a process and apparatus of the aforedescribed nature which permit the calculation of electrophoretic curves by simple methods easily available, as for example, colorimetry and direct tests of the separated components.

A further object is to provide a process and apparatus of the aforedescribed nature that is applicable to either analytical or preparative electrophoresis. When utilized for preparative purposes it is continuous in practice and requires little or no observation and manipulation.

These and other objects and advantages of the present invention will become apparent from the following detailed description, when taken in conjunction with the appended drawings, wherein:

Figure 3 is a front elevational view partly broken away in vertical section of a preferred form of apparatus embodying the present invention;

Figure 1:
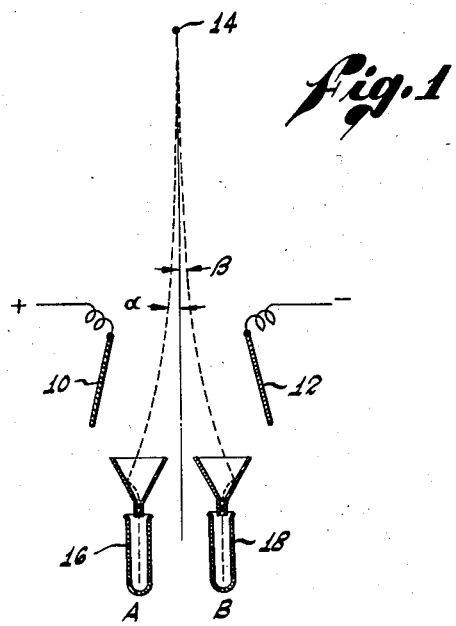
Figure 1 is a diagrammetric view demonstrating the principle of electrophoresis as conducted by heretofore-proposed techniques.

Referring to the drawings and particularly Figure 1 thereof, electrophoresis as generally conducted by common heretofore-proposed techniques utilizes a pair of spaced electrodes 10 and 12 bearing opposite electrical charges. The fluid system from which the components are to be separated is allowed to progress in a stream from a starting point 14 located above and centrally of the electrodes 10 and 12. As the negatively charged particles in the flowing stream approach the electrical field set up between the two electrodes they are attracted toward the positively charged electrode 10. Simultaneously, the positively charged particles are attracted toward the negatively charged electrode 12. The angle of divergence assumed by the negatively charged particles is indicated by alpha while that assumed by the positively charged particles is indicated by beta. The negatively charged particles are deposited within a first container 16 and the positively charged particles are deposited within a second container 18. The spatial separation between the negatively and positively charged particles is equal to the distance between the points A and B.

Figure 2:
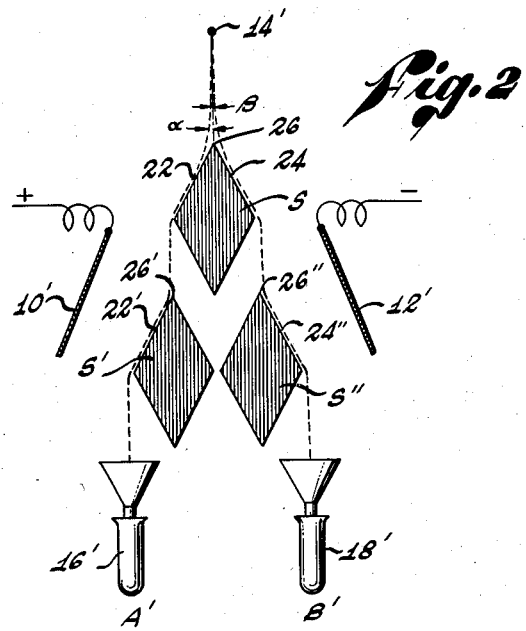
Figure 2 is a diagrammetric view demonstrating the basic operation of the process and apparatus of the present invention.

Referring now to Figure 2, the process and apparatus of the present invention utilizes essentially the basic electrophoretic technique described immediately hereinabove. However, it additionally employs novel means for effecting the magnification of the spatial separation between the positively and negatively charged particles. Such novel means includes a plurality of separators S, S' and S" which are interposed between the oppositely charged electrodes 10 and 11. These separators may be of a diamond, or other cross-sectional shape, having sides 22 and 24 which are inclined away from one another. The leading point 26 of the initial separator S is disposed immediately below the starting point 14' of the complex fluid system from which the components are to be separated. The separators S' and S" are arranged in a row farther removed than the initial separator and with longitudinal axes parallel therewith. The leading points 26' and 26" of the separators S' and S", respectively, are disposed immediately beyond the distal ends of the sides 22 and 24 of the initial separator S.

With this arrangement, as the negatively charged particles from the flowing stream approach the electrical field set up between the two electrodes 10' and 12' they are attracted towards the positively charged electrode 10'. Simultaneously, the positively charged particles are attracted towards the negatively charged electrode 12'. The angles of divergence of the particles are again equal to alpha and beta, as in the case represented in Figure 1. As the negatively charged particles reach the initial separator S, however, they will contact the left side 22 thereof. Similarly, the positively charged particles will contact the right side 24 of this separator. Continued progressive movement of the negatively and positively charged particles will then effect a mechanical separation therebetween until they finally reach the distal ends of the sides 22 and 24, respectively. The negatively charged particles will then proceed until they contact the left side 22' of the separator S' while the positively charged particles will simultaneously contact the right side 24" of the separator S". Continued progressive movement of the particles will result in their further mechanical separation until at the time they pass beyond the distal ends of the sides 22' and 24", their spatial separation will be equal to the distance between points A' and B'. It will be apparent that the latter distance is appreciably greater than the distance A B achieved with the conventional electrophoretic technique disclosed in Figure 1. It will also be apparent that the spatial separation of the charged particles could be magnified still further by the positioning of additional separators beyond those designated S' and S".

Referring now to the remaining figures of the drawings, there is shown a preferred form of apparatus adapted to be utilized in carrying out the process of the present invention. This apparatus broadly comprises a housing H wherein are disposed a plurality of aligned rows of separators S. The housing H is formed of a pair of side walls 30 and 32 which taper upwardly and inwardly in the form of a truncated triangle, a horizontal base wall 34 and end walls 36 and 38 which interconnect the ends of the side walls 30 and 32. The top of the housing H is normally closed by means of a cover, generally designated 40. A pair of legs, generally designated 42 and 43, respectively, extend downwardly from the lower sides of the housing H. These legs 42 and 43 are adapted to be disposed in a pair of electrode boxes 44 and 45 for a purpose to be described hereinafter. A pair of electrodes 46 and 48 are positioned adjacent the inner surface of each of the end walls 30 and 32. These electrodes are adapted to be adjusted vertically relative to the housing H.

More particularly, the cover 40 may be slidably disposed within a groove 50 defined between the upper ends of the side walls 30 and 32 and a pair of integral flanges 52 and 54 which extend inwardly from the side walls. The mid-portion of the cover 40 is formed with an upwardly extending mixture supply tube 56 by means of which the solution to be separated enters the housing. A pair of upwardly extending vehicle fluid tubes 58 and 60 are formed on the cover 40 at equally spaced distances from either side of the mixture supply tube 56. The upper row of separators S consists of four individual diamonds, designated 62, 64, 66 and 68. The center of the mixture supply tube 56 is disposed immediately above the strait or passage between the inner diamonds 64 and 66. The centers of the vehicle fluid tubes 58 and 60 are disposed immediately above the leading points 70 of the diamonds 64 and 66. The second row of separators contains five diamonds, designated 74, 76, 78, 80 and 82. It will be observed that the adjacent obtuse points of the separators nearly contact one another whereby there are defined a plurality of straits or passages 84. The diamonds 74 through 82 of the second row are off-set by one half the width of a single diamond with respect to those of the first row so that the leading points 70 of the diamonds in the second row will lie immediately below the center of the strait thereabove. With respect to the rows of separators disposed below the second row, one additional diamond is added to each row.

The length of the base wall 34 is formed with a plurality of horizontally spaced apertures 92. These apertures 92 are disposed within reservoirs 93 defined between the lower truncated tips of the lowermost row of diamonds and the upper surface of the base wall 34. A withdrawal tube 98 extends downwardly from each of the apertures 92. These tubes 98 may be formed as an integral part of the base wall. If desired, the withdrawal tubes 98 may be staggered with respect to the width of the base wall in order to increase the distance between them.

Figure 4:
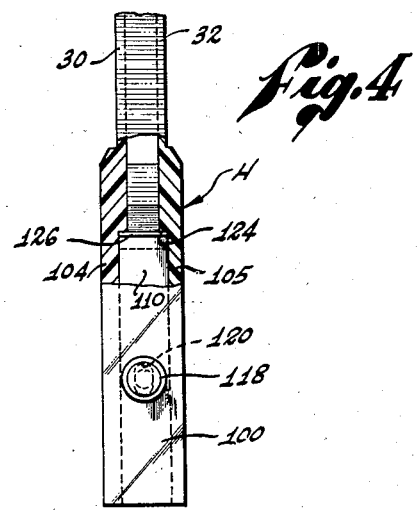
Figure 4 is a vertical sectional view taken on line 4—4 of Figure 3.
Figure 6:
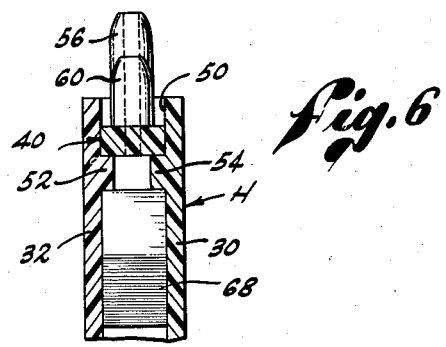
Figure 6 is a vertical sectional view taken on line 6—6 of Figure 3.

The legs 42 and 43 are of identical construction and they are each defined by an outer end wall 100 forming an integral downward vertical continuation of the end walls 36 and 38 of the housing H, an inner end wall 102 which extends downwardly from the outer ends of the base wall 34, and a pair of side walls 104 and 105 which extend between the end walls. The side walls 104 and 105 are formed with a plurality of openings 106. The top and bottom of the legs are open, however, the upper ends thereof are normally closed with respect to the lower portion of the housing H by means of a holder member, generally designated 108. Each of these holder members 108 is of inverted L-shaped inner configuration having a vertical leg 110 that normally abuts the inner surface of the outer end walls 100 of the legs and a horizontal leg 112 that is normally disposed within the space between the upper end of each leg and the outer lower portion of the housing H. The horizontal leg 112 is formed with a plurality of vertically extending apertures 114. The holder members 108 are removably secured within the legs 42 and 43 by means of a set screw 118 which is extended through an annular opening 120 in the outer end walls 100 so as to thread into the socket 122 formed in the vertical leg 110. As indicated in Figure 4, a downwardly facing horizontal shoulder 124 is defined between the upper end of each leg 42 and 43 and the lower end portion of the housing H. A sheet of filter paper 126 is normally interposed between the upper surface of each horizontal leg 112 of the holder members and the shoulder 124. The purpose of this filter paper 126 will be described hereinafter.

Figure 5:
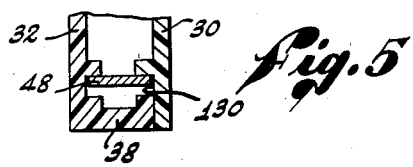
Figure 5 is an inclined sectional view taken on line 5—5 of Figure 3.

The electrodes 46 and 48 consist of rectangular metal or carbon plates which are slidably positioned within grooves 130 formed in the end walls 36 and 38, as indicated in Figure 5. The upper end of the electrodes 46 and 48 are connected to conductor wires 132 and 134, respectively. These wires extend upwardly through the grooves 130 of the upper portion of the housing H from which they protrude through openings 136 formed in the end walls 36 and 38. Preferably all of the aforedescribed elements except the filter paper 126, the electrodes 46 and 48 and the conductor wires 132 and 134 are formed of a non-electrical conducting material, such as transparent plastic.

It may be desirable under certain conditions to fill the space within the housing H with a migratory medium or anticonvection agent 140, such as sand, silica gel, starch, porous materials, or the like, as indicated at the right hand side of Figure 3. This medium or agent serves to slow rate of flow or to prevent convection disturbances of the solution being separated.

In the operation of the aforedescribed apparatus, the legs 42 and 43 are first immersed within the electrode boxes 44 and 45, respectively. These boxes contain solutions in which are immersed electrodes bearing opposite electrical charges, for example, the electrode box 44 may be positively charged while the electrode box 45 may be negatively charged. The solution to be separated enters the housing H by means of the mixture supplied to 56 and converges so as to pass in a stream through the strait 84 between the inner diamonds 64 and 66 of the first row. Beyond this strait the stream will diverge into two secondary streams under the influence of the electrical fields set up between the electrode boxes 44 and 45, and the electrodes 46 and 48, the negatively charged particles moving to the left and the positively charged particles moving towards the right. The negatively charged particles will then flow progressively along the proximal left side of the diamond 78 while the positively charged particles will flow progressively along the proximal right hand side of this diamond. As the secondary streams flow beyond the proximal sides of the diamond 78 they will in turn be separated into two new streams by virtue of the electrical field, the most highly negatively charged particles passing to the left of the leading edge of the diamond 142 and those particles having a smaller negative charge passing to the right thereof. The same will be true with respect to the secondary stream which passes progressively along the proximal right hand side of the diamond 78. Assuming that each of the secondary streams are initially homogeneous in the distribution of the components to be separated, the components whose force vectors are directed to the left of the leading point of diamond 142 will be relatively concentrated in the stream passing along the left of this diamond and decreased in concentration in the stream passing along the right hand surface of this diamond. Those components whose resultant force vectors point to the right of the longitudinal axis of the diamond 142 will be relatively concentrated in the stream passing along the right hand edge thereof and decreased in concentration in the stream passing along the left edge thereof. As these secondary streams progress through the succesisve straits they will be divided by the leading points of the next row of diamond into four tertiary streams.

The concentrations in the tertiary streams $T_1$, $T_2$, $T_3$, and $T_4$ from left to right of a given component $x$ whose resultant force vector is directed to the left of the leading points of the diamonds may be expressed in the following manner:

$$T_1^x > T_2^x \geq T_3^x > T_4^x$$

The concentrations in the same tertiary streams of a given component Y whose resultant force vector is directed to the right of the leading points of the diamonds may be expressed in this manner:

$$T_1^Y < T_2^Y \leq T_3^Y < T_4^Y$$

If the streams be passed through a series of rows of separators the ratio of the amount of $x$ to the amount of Y will progressively increase in those streams passing to the left and the converse will occur in those streams passing to the right. Those components whose resultant force vectors lie within the angle formed by the two most divergent resultant force vectors will be relatively concentrated in the intermediately disposed of the reservoirs 93. It is thus possible to separate and purify to an infinite degree any two or more components of a complex fluid system having different directions of their resultant force vectors by passage of that fluid system through a sufficient number of rows of separators.

During this aforedescribed process it is desirable to feed a vehicle or buffer solution into the interior of the housing H. Such buffer solution may be composed, for example, of barbital, acetic acid, or phosphoric acid of appropriate pH and ionic concentration. This buffer solution will impart a desired electrical charge to the particles to be separated so as to assist in such separation. The vehicle or buffer solution may be fed into the housing through the vehicle fluid tubes 58 and 60. The filter paper 126 disposed above the legs 42 and 43 prevents the migratory medium 140 from settling out through the apertures 114 formed in the holder members 108. The latter apertures serve to provide communication between the solution in the electrode boxes 44 and 45 and the interior of the housing.

The electrodes 46 and 48 permit variation of the electrical field whereby the gradually increasing potential gradient which normally occurs when applied through the legs 42 and 43 from the electrode boxes may be avoided, if desired, and a more uniform separatory force may be applied during the separatory operation.

The process and apparatus of the present invention may be utilized in separating any fluid system containing two or more components to which can be imparted force vectors of different directions in the manner set forth hereinabove. Following is a list setting forth some of these applications:

(1) Separation of biogenic substances such as antibiotics, hormones, vitamins, alkaloids, amino acids, peptides, proteins, enzymes, lipids, glycosides, and carbohydrates from complex fluid systems.

(2) Separation of the cellular and plasma components of the blood into different cell types and plasma protein fractions.

(3) Separation of viruses, bacteria, yeasts, and fungi from complex fluid systems.

(4) Separation of mitochondria and other cell structures from tissue homogenates.

(5) Separation of the components of fluid foods and extracts.

(6) Separation of the components of emulsions and suspensions.

(7) Separation of ionized hydrocarbons.

(8) Benefaction and dressing of mineral ores.

(9) Separation of the components of clays and solids.

(10) Separation of polymers, elastomers, detergents, dyes, and pigments.

(11) Separation of ion and isotope mixtures.

While there has been shown and described hereinabove what is presently considered to be the preferred form of the process and apparatus embodying the present invention, it will be apparent that various modifications and changes may be made thereto without departing from the spirit of the invention or the scope of the appended claims. For example, although the separators S are shown as being of a diamond shape, they may also assume other shapes, configurations, and arrangements. These separators may also be arranged in different relative positions and still serve their desired purpose of deflection and redistribution of a stream which has been rendered non-homogenous by differences in electrophoretic mobility of the components. Additionally, the resultant deflection force may be provided by other forces or combinations of forces than those of electrophoresis and gravity, for instance magnetic, electrostatic, and centrifugal forces may prove valuable.

I claim:

1. Apparatus for separating the components of a complex fluid system, comprising: a housing; a plurality of generally diamond-shaped separators disposed in horizontal rows within said housing, each diamond in a row being horizontally spaced from its neighbor and the upper points of the separators in each row below the top row being vertically aligned with the mid-portion of the space between the two separators located immediately thereabove; a cover for said housing; a pair of buffer solution supply tubes formed in said cover in vertical alignment with the upper points of two adjacent separators in the top row of separators; a supply tube for said system formed in said cover in vertical alignment with the horizontal space between said two adjacent separators; a base wall at the bottom of said housing, the lowermost row of separators being truncated so as to abut the upper surface of said base wall and thereby define a plurality of reservoirs; a withdrawal tube depending from each of said reservoirs; a porous anti-convection agent encompassing said separators, and, means for impressing an electric field across said rows of separators.

2. Apparatus for use with a pair of electrode boxes in separating the components of a complex fluid system, comprising: a housing; a plurality of generally diamond-shaped separators disposed in horizontal rows within said housing, each diamond in a row being horizontally spaced from its neighbor and the upper points of the separators in each row below the top row being vertically aligned with the mid-portion of the space between the two separators located immediately thereabove; a cover for said housing; a pair of buffer solution supply tubes formed in said cover in vertical alignment with the upper points of two adjacent separators in the top row of separators; a supply tube for said system formed in said cover in vertical alignment with the horizontal space between said two adjacent separators; a base wall at the bottom of said housing, the lowermost row of separators being truncated so as to abut the upper surface of said base wall and thereby define a plurality of reservoirs; a withdrawal tube depending from each of said reservoirs; a porous anti-convection agent encompasing said separators; a hollow leg depending from each side of the lower portion of said housing, the upper ends of said legs being in communication with the interior of said housing; an electrode box encompassing each of said legs; a holder member removably secured within each of said legs and having an apertured horizontal element disposed at the upper end of said leg; and filter paper covering the upper surface of each of said apertured horizontal elements.

3. Apparatus as set forth in claim 2 where a pair of electrodes are vertically adjustably mounted at each side of said housing.

References Cited in the file of this patent

UNITED STATES PATENTS

| 2,555,487 | Haugaard et al. | June 5, 1951 |

FOREIGN PATENTS

| 679,278 | Great Britain | Sept. 17, 1952 |
| 716,875 | Great Britain | Oct. 13, 1954 |